Feb. 28, 1967   F. C. BREWSTER   3,307,097
POLARITY RESPONSIVE BATTERY CHARGES
Filed April 29, 1964
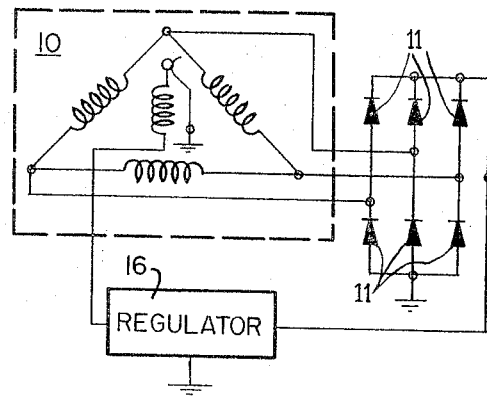
FIG. 1
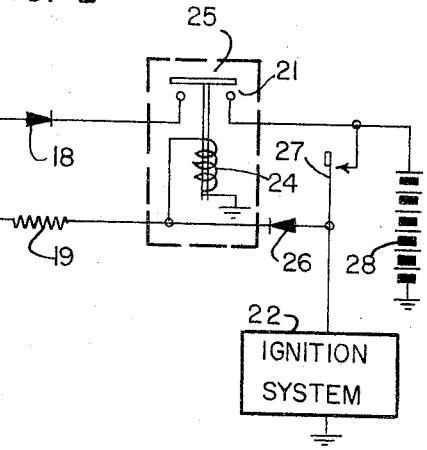
FIG. 2
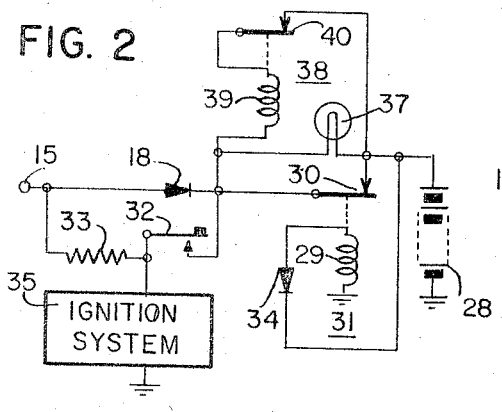
FIG. 3
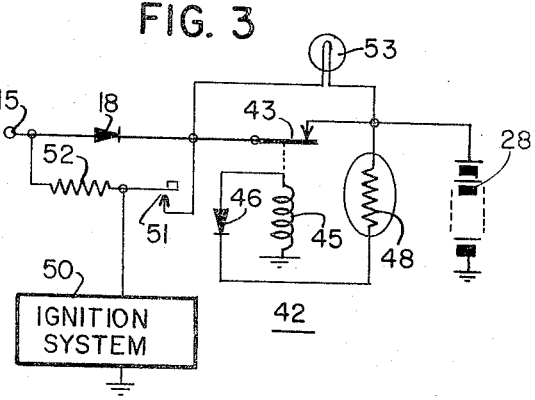
FIG. 4
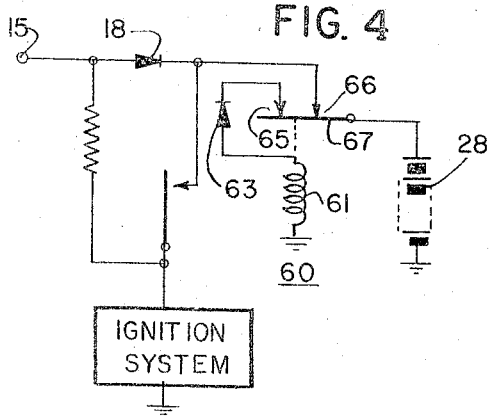
INVENTOR.
FRANKLIN C. BREWSTER
BY Mueller and Aichele
Attys.

United States Patent Office 3,307,097
Patented Feb. 28, 1967

3,307,097
POLARITY RESPONSIVE BATTERY CHARGER
Franklin C. Brewster, Franklin Park, Ill., assignor to Motorola, Inc., Franklin Park, Ill., a corporation of Illinois
Filed Apr. 29, 1964, Ser. No. 363,545
8 Claims. (Cl. 320—25)

This invention relates to motor vehicle alternator-rectifier systems, and in particular to a protective circuit for preventing damage to diode rectifiers used therein by the application of a potential of incorrect polarity to the system.

In modern automobiles, the direct current supply is commonly provided by an alternator whose output is converted to direct current through the use of diode rectifiers. If a new battery is installed, or if the installed battery is reinforced with another battery, and the new battery is connected into the circuit with its polarity reversed from that for which the circuit was designed, the rectifying diodes will be connected across the new battery in the forward direction and the current flow through the diodes will be limited only by the resistance of the wiring and the battery. This heavy current will destroy the diodes unless they are protected.

It is therefore an object of this invention to provide a protective circuit for diodes used in a motor vehicle to prevent damage to the diodes by the application of a voltage of incorrect polarity to the alternator system.

Another object of this invention is to provide a protective circuit for rectifier diodes used in a motor vehicle, which gives an indication when a voltage of incorrect polarity is applied to the alternator system.

Another object of this invention is to provide a protective circuit for rectifier diodes used in a motor vehicle alternator system which does not consume power when the vehicle is not in use.

A feature of this invention is the provision of a protective circuit for a motor vehicle alternator system including rectifying diodes and a storage battery with a relay operative to disconnect the diodes from the battery when the battery is connected to the alternator system with the incorrect polarity.

Another feature of this invention is the provision of a protective circuit for a motor vehicle alternator system in accordance with the preceding feature and in which an indicator lamp is coupled across the relay to give an indication when the battery connected to the alternator system has the wrong polarity.

Still another feature of this invention is the provision of a protective circuit for a motor vehicle alternator system with a device for producing an audible sound to indicate that a battery is connected to the alternator system with reversed polarity.

A further feature of this invention is the provision of a protective circuit for a motor vehicle alternator system in which the protective device is coupled to the battery through the ignition switch to prevent the protective device from consuming energy when the motor vehicle is inoperative.

Another feature of this invention is the provision of a protective circuit for a motor vehicle alternator system including a relay and in which the relay operates intermittently or is protected by a thermistor to prevent the relay from being overloaded.

In the drawings:

FIG. 1 illustrates a diode protection system for a motor vehicle alternator system in accordance with the invention;

FIG. 2 illustrates a diode protection system incorporating an indicator lamp and buzzer which are actuated when the polarity of the battery is not correct;

FIG. 3 illustrates a diode protection system incorporating a thermistor for relay overload protection; and FIG. 4 illustrates a diode protection system incorporating an intermittently operated protective relay.

In practicing this invention a motor vehicle alternator system is coupled to a storage battery through normally open relay contacts. The relay coil is coupled to the storage battery through an ignition switch and a diode poled to prevent the flow of current from the storage battery to the relay coil when the battery is connected with its polarity reversed. When the storage battery is connected to the alternator system with the correct polarity, closing the ignition switch connects the relay coil to the battery and current will flow through the diode and the relay coil. The normally open relay contact is closed and the storage battery is coupled to the alternator-rectifier system.

In another embodiment of this invention the storage battery is coupled to the alternator-rectifier system through normally closed relay contacts. The relay coil is coupled to the battery through a diode poled to energize the relay coil when the storage battery is connected to the alternator system with incorrect polarity. The energization of the relay coil opens the normally closed contact disconnecting the alternator-rectifier system from the battery. An indicator such as a lamp or buzzer may be connected across the relay contact to give an audible or visual warning of the incorrect polarity of the battery. Overloading of the relay coil is prevented by the use of an intermittently operated relay or a thermistor in series with the relay coil.

FIG. 1 illustrates a motor vehicle alternator system with a protective relay to prevent damage to the rectifier diodes. An alternator 10 supplies an alternating current output which is rectified by diodes 11. The direct current output of diodes 11 is coupled to storage battery 28 through isolation diode 18 and normally open relay contact 21. The output voltage of alternator 10 is regulated by regulator 16. Relay coil 24 is coupled to storage battery 28 through diode 26 and ignition switch 27. A resistor 19 bypasses isolation diode 18 to provide an initial field current to regulator 16. Resistor 19 also provides a current path from alternator 10 through relay coil 24 thus holding contact 21 closed until the alternator output voltage is reduced to a low value. This prevents damage to the rectifying diodes, as might occur if contact 21 were opened with the output of alternator 10 at a high value. The ignition system 22 is coupled to alternator 10 through isolation diode 18, switch contact 21 and ignition switch 27, and to storage battery 28 through ignition switch 27.

In operation, with protective relay 25 removed from the circuit and with storage battery 28 connected to the circuit with its polarity reversed, diodes 11 and 18 are biased in the forward direction and will draw a current heavy enough to destroy the diodes. If battery 28 is coupled to the circuit with its polarity correct, diodes 11 and 18 are biased in the reverse direction and no current will flow through the diodes. With protective relay 25 coupled to the circuit, diodes 11 and 18 are coupled to battery 28 through normally open contact 21. If the polarity of battery 28 is correct, closing ignition switch 27 will cause a current to flow through diode 26 and relay coil 24 actuating relay 25 and causing relay contact 21 to close. The closing of relay contact 21 couples battery 28 to the alternator system. However, if battery 28 is coupled to the system with its polarity reversed, diode 26 will block the flow of current through relay coil 24 and contact 21 will remain open. Diodes 11 and 18 will not be coupled to storage battery 28 when its polarity is reversed and thus are protected from damage by excessive current. Ignition switch 17 is open when the motor vehicle is not in operation to prevent current drain from storage battery 28 through relay coil 24.

FIG. 2 shows another embodiment of the protective circuit used in an alternator system for a motor vehicle automobile electrical system. Terminal 15 of FIG. 2 is identical to terminal 15 of FIG. 1 and is connected to battery 28 through normally closed contact 30 of relay 31. Relay coil 29 is connected through diode 34 to battery 28. Diode 34 is poled to prevent current flow through coil 29 when the battery is connected to the alternator system with its polarity correct. If the polarity of battery 28 is reversed current will flow from battery 28 through diode 34 and relay coil 29, energizing relay 31. Contact 30 will then open breaking the connection between battery 28 and diodes 11 and 18 and preventing current from flowing through the diodes.

When relay contact 30 opens the full battery voltage minus the voltage drop across the diodes appears across contact 30 and indicating lamp 37 will light to give a visual indication of an incorrect battery connection. Buzzer 38, consisting of relay coil 39 in series with relay contact 40, gives an audible alarm indicating that battery 28 has been connected with its polarity reversed.

FIG. 3 shows another embodiment of the protective circuit in which terminal 15 is identical to terminal 15 of FIG. 1. Battery 28 is connected to terminal 15 through normally closed contact 43 of relay 42. Battery 28 is connected to relay coil 45 through thermistor 48 and diode 46. Diode 46 is poled so that no current will flow through the relay coil when the battery is connected with its polarity correct. If an incorrect connection is made, current flows through relay coil 45, relay 42 is energized and contact 43 opens disconnecting the battery from the rectifier diode 11 and isolation diode 18. Lamp 53 is connected across relay contact 43 and gives a visual indication of an incorrect battery connection.

With the diodes normally used in a circuit of this type, the voltage drop across the diodes, when they are conducting, is approximately 1 volt per diode. In the circuit shown in FIG. 3 there are three diodes in series, diodes 11 and 18, and therefore the voltage drop from relay contact 43 to ground would be approximately 3 volts if the battery were connected with its polarity reversed. Since there is a voltage drop of approximately 1 volt across diode 46, approximately 2 volts would be applied across relay coil 45. However, when relay 42 is energized and contact 43 opens, the voltage across coil 45 rises to the full battery voltage which can be as high as 12 volts, less the drop in diode 46, in an automobile. This increased voltage is now impressed across diode 46 and relay coil 45 and the current through relay coil 45 increases. In order to prevent damage to relay coil 45, thermistor 48 is connected in series with coil 45 to limit the current through the coil to a safe value.

Another embodiment of the protective circuit is shown in FIG. 4 with terminal 15 being identical to terminal 15 of FIG. 1. Relay coil 61 of relay 60 is connected across the battery 28 in series with diode 63 and relay contact 65. Diode 63 is poled so that current will flow to relay coil 61 only when battery 28 is connected with its polarity incorrect. When battery 28 is connected incorrectly, current flowing through relay coil 61 energizes relay 60 and opens relay contacts 65 and 66. When relay contact 66 opens, the rectifier diodes 11 and isolation diode 18 are disconnected from battery 28. Relay 60 is a special type of relay in which contact 66 opens before contact 65 and contact 65 closes before contact 66. When contact 65 opens, relay 60 is de-energized and relay contact arm 67 returns to its closed position. Relay contact arm 67 is connected to relay contact 65 before it is connected to relay contact 66 so that the relay is energized before the diodes can be re-connected into the circuit. The energization of relay 60 will cause contact 65 to again open. Contact arm 67 thus alternately opens and closes the circuit from battery 28 to relay coil 61 without closing the circuit connecting battery 28 to the rectifying and isolation diodes. This rapid opening and closing of relay contact 46 produces an audible warning of an incorrect battery connection and prevents overheating of relay coil 61.

Thus a system has been shown for protecting the rectifying and isolation diodes of a motor vehicle alternator system. A relay, operative according to the polarity of the battery, breaks the circuit between the battery and the diodes if the battery is connected to the diodes with incorrect polarity. Visual and audible warnings are provided to indicate that an incorrect connection has been made, and means are provided to prevent overheating of the protective relay.

What is claimed is:

1. A protective circuit for use in a motor vehicle electrical system which includes a storage battery, an alternating current generator, a plurality of rectifying diodes coupled to the generator and poled to develop a potential of the proper polarity to charge the battery, and an isolation diode coupled to the plurality of rectifying diodes, the isolation diode being poled to pass current from the rectifying diodes to the storage battery, said protective circuit including in combination, relay means having normally open contacts and a relay coil, a circuit including said contacts coupling the isolation diode to the battery, blocking diode means coupling the battery to said relay coil, said relay coil and said blocking diode means being responsive to a correct polarity connection of the battery to close said contacts and couple the battery to the plurality of diodes, said relay coil and said blocking diode further being responsive to an incorrect polarity connection of the battery to open said contacts and uncouple the battery from the plurality of diodes, and resistance means coupling the rectifying diodes to said relay coil.

2. A protective circuit for use in a motor vehicle electrical system which includes a storage battery, an alternating current generator, a plurality of rectifying diodes coupled to the generator and poled to develop a potential of the proper polarity to charge the battery and an isolation diode coupled to the plurality of rectifying diodes, the isolation diode being poled to pass current from the rectifying diodes to the storage battery, said protective circuit including in combination, relay means including a relay coil and having a normally open relay contact coupled to the isolation diode and to the battery, switch means and blocking diode means series connected and coupling the battery to said relay coil, said blocking diode means being responsive to the polarity of the battery to permit current to flow through said relay coil when the battery is coupled to the charging system with correct polarity and to prevent current flow through said relay coil when the battery is coupled to the charging system with incorrect polarity, said relay contact being responsive to a flow of current through said relay coil to close thereby coupling the battery to the isolation diode, and resistance means coupling the rectifying diodes to said relay coil.

3. A protective circuit for use in a motor vehicle electrical system which includes a storage battery, an alternating current generator, and a plurality of rectifying diodes coupled to the generator and poled to develop a potential of the proper polarity to charge the battery, said protective circuit including in combination, relay means including a relay coil and having a normally closed relay contact coupled to the plurality of rectifying diodes and to the battery, blocking diode means directly connecting the battery to said relay coil and responsive to the polarity of the battery to permit current to flow through said relay coil when the battery is coupled to the charging system with incorrect polarity and to prevent current flow through said relay coil when the battery is coupled to the charging system with correct polarity, said relay means being responsive to a flow of current through said relay coil to open said relay contact thereby uncoupling the battery from the plurality of rectifying diodes.

4. A protective circuit for use in a motor vehicle electrical system which includes a storage battery, an alternating current generator, and a plurality of rectifying diodes coupled to the generator and poled to develop a potential of the proper polarity to charge the battery, said protective circuit including in combination, relay means including a relay coil and having a normally closed relay contact coupled to the plurality of rectifying diodes and to the battery, blocking diode means coupling the battery to said relay coil and responsive to the polarity of the battery to permit current to flow through said relay coil when the battery is coupled to the charging system with incorrect polarity and to prevent current flow through said relay coil when the battery is coupled to the charging system with correct polarity, said relay means being responsive to a flow of current through said relay coil to open said relay contact thereby uncoupling the battery from the plurality of rectifying diodes, and lamp means connected across said relay contact and responsive to the opening thereof to give a visible indication of said opening.

5. A protective circuit for use in a motor vehicle electrical system which includes a storage battery, an alternating current generator, and a plurality of rectifying diodes coupled to the generator and poled to develop a potential of the proper polarity to charge the battery, said protective circuit including in combination, first relay means having a normally closed first relay contact coupled to the plurality of rectifying diodes and to the battery and a first relay coil, blocking diode means coupling the battery to said first relay coil, with correct polarity, said first relay means being responsive to a flow of current through said first relay coil to relay coil to open said contact thereby uncoupling the responsive to a flow current through said relay coil to open said first contact thereby uncoupling the battery from the plurality of rectifying diodes, a second relay means having a second relay coil and a second normally closed relay contact series connected across said first relay contact, said second relay means being responsive to said opening of said first relay contact to produce an audible indication thereof, and lamp means connected across said first relay contact and responsive to the opening thereof to give a visible indication of said opening.

6. A protective circuit for use in a motor vehicle electrical system which includes a storage battery, an alternating current generator, and a plurality of rectifying diodes coupled to the generator and poled to develop a potential of the proper polarity to charge the battery, said protection circuit including in combination, relay means having a normally closed relay contact coupled to the plurality of rectifying diodes and to the battery and a relay coil, thermistor means and blocking diode means series connected and directly connecting the battery to said relay coil, said blocking diode means being responsive to the polarity of the battery to permit current to flow through said relay coil when the battery is coupled to the charging system with correct polarity, said relay means being responsive to a flow of current through said relay coil to open said contact thereby uncoupling the battery from the plurality of rectifying diodes.

7. A protective circuit for use in a motor vehicle electrical system which includes a storage battery, an alternating current generator, and a plurality of rectifying diodes coupled to the generator and poled to develop a potential of the proper polarity to charge the battery, said protective circuit including in combination, relay means having a normally closed relay contact coupled to the plurality of rectifying diodes and to the battery and a relay coil, thermistor means and blocking diode means series connected and coupling the battery to said relay coil, said blocking diode means being responsive to the polarity of the battery to permit current to flow through said relay coil when the battery is coupled to the charging system with incorrect polarity and to prevent current flow through said relay coil when the battery is coupled to the charging system with correct polarity, said relay means being responsive to a flow of current through said relay coil to open said contact thereby uncoupling the battery from the plurality of rectifying diodes, said thermistor means being responsive to the battery potential to limit the current through said relay coil, and lamp means coupled across said contact and responsive to the opening thereof to give a visible indication of said opening.

8. A protective circuit for use in a motor vehicle electrical system which includes a storage battery, an alternating current generator, and a plurality of rectifying diodes coupled to the generator and poled to develop a potential of the proper polarity to charge the battery, said protective circuit including in combination, relay means having first and second normally closed relay contacts and a relay coil, said first relay contact being coupled to the plurality of rectifying diodes and to the battery, said second relay contact and blocking diode means series connected and coupling the battery to said relay coil, said blocking diode means being responsive to the polarity of the battery to permit current to flow through said relay coil when the battery is coupled to the charging system with incorrect polarity and to prevent current flow through said relay coil when the battery is coupled to the charging system with correct polarity, said relay means being responsive to a flow of current through said relay coil to energize the same, said first and second relay contacts being responsive to said relay coil to open when said relay coil is energized, the opening and closing of said relay contacts having a timed relation whereby said first relay contact opens before said second relay contact and said second relay contact closes before said first relay contact, the opening and closing of said second relay contact causing said relay coil to become alternately energized and de-energized thereby giving an audible indication of the incorrect polarity connection of the battery.

References Cited by the Examiner
UNITED STATES PATENTS

| | | | |
|---|---|---|---|
| 3,042,835 | 7/1962 | Badger | 317—8 X |
| 3,085,187 | 4/1963 | Godshalk | 320—25 |
| 3,219,903 | 11/1965 | Larson | 320—25 X |

JOHN F. COUCH, *Primary Examiner.*

S. WEINBERG, *Assistant Examiner.*